United States Patent [19]
Coel

[11] 3,931,992
[45] Jan. 13, 1976

[54] UNIVERSAL JOINT CONNECTOR

[75] Inventor: Joseph B. Coel, Menomonee Falls, Wis.

[73] Assignee: Badger Meter, Inc., Milwaukee, Wis.

[22] Filed: Nov. 30, 1973

[21] Appl. No.: 420,619

[52] U.S. Cl. .................. 285/30; 285/271; 285/354
[51] Int. Cl.² .......................................... F16L 27/06
[58] Field of Search ............. 285/30, 261, 263, 245, 285/271, 266, 52, 354

[56] References Cited
UNITED STATES PATENTS

| | | | |
|---|---|---|---|
| 717,882 | 1/1903 | Martin | 285/271 |
| 1,914,736 | 6/1933 | Coutu | 285/271 |
| 1,985,502 | 12/1934 | Isenberg | 285/261 X |
| 1,997,845 | 4/1935 | Adams | 285/30 X |
| 2,031,878 | 2/1936 | Coutu | 285/271 X |
| 2,422,597 | 6/1947 | Stewart | 285/261 X |
| 2,704,678 | 3/1955 | Klein et al. | 285/261 |
| 3,033,596 | 5/1962 | Pearring | 285/261 |
| 3,115,354 | 12/1963 | Bowan et al. | 285/52 |
| 3,361,450 | 1/1968 | Franck | 285/354 X |
| 3,479,061 | 11/1969 | Smookler et al. | 285/263 X |

FOREIGN PATENTS OR APPLICATIONS

| | | | |
|---|---|---|---|
| 158,908 | 2/1933 | Switzerland | 285/245 |
| 1,114,891 | 12/1955 | France | 285/261 |

*Primary Examiner*—Thomas F. Callaghan
*Attorney, Agent, or Firm*—Neuman, Williams, Anderson & Olson

[57] ABSTRACT

A connector construction employs a tail piece having a ball end, a socket element having a distendable end adapted to be snapped over said ball end and a coupling nut adapted to house the ball end and socket while threadedly engaging a pipe distal end to be connected thereto. The nut, when threaded into engagement with the pipe element, urges the socket element into fluid sealing engagement with the ball end and nut regardless of the angular disposition of the tail piece relative to the pipe element. The provided connector is particularly adapted for use with water meters or in similar applications in which spaced pipe ends or conduits to be interconnected by an interposed meter or the like are misaligned.

18 Claims, 3 Drawing Figures

UNIVERSAL JOINT CONNECTOR

BACKGROUND OF THE INVENTION

This invention relates to a connector construction and more particularly pertains to a plumbing joint connector which allows universal movement between elements thereof, thereby enabling a fluid connection to be effected between misaligned conduits.

In a more specific application, the connector hereinafter described in detail may be employed to advantage in connecting an interposed water meter to misaligned pipes of a water supply system.

The prior art, although cognizant of the desirability of universal joint movement in certain apparatus uses such as disclosed in Mango U.S. letters Pat. No. 3,145,932 which issued Aug. 25, 1964, directed to an aerator, has never satisfactorily provided joint flexibility such as is necessary in joining misaligned fluid conduits to an interposed meter. Joint constructions permitting the connection of such misaligned conduits must not only provide fluid flow along a non-axial path because of the misalignment, but must also maintain the fluid-tight integrity of the entire fluid-flow system.

The prior art in attempts to combat meter hookup difficulties due to conduit end misalignment have included the use of goose neck conduits such as are disclosed in Mueller U.S. letters Pat. No. 2,795,437 which issued June 11, 1957 and flexible lead nipples such as are disclosed in Ellis U.S. letters Pat. No. 1,949,829 which issued Mar. 6, 1934.

It is an object of this invention to provide a plumbing joint connector allowing universal relative movement between fluid conduit elements thereof so as to effect a fluid-tight joint between misaligned fluid conduits to which connected.

It is another object of this invention to provide a fluid meter construction employing at least one connector permitting universal movement. Such movement allows the fluid conduits in series with the interposed meter to be connected thereto though in non-axial alignment. Because of such universal movement permitted in the connector elements, a meter may interconnect fluid conduits in non-axial alignment without strains on the meter body.

It is another object of this invention to provide a connector construction allowing a wide range of angular dispositions between fluid conduits to be connected thereby in a fluid-tight manner.

The above and other objects of this invention will become more apparent from the following description when read in the light of the accompanying drawing in which.

DESCRIPTION OF THE INVENTION

Figure 1:
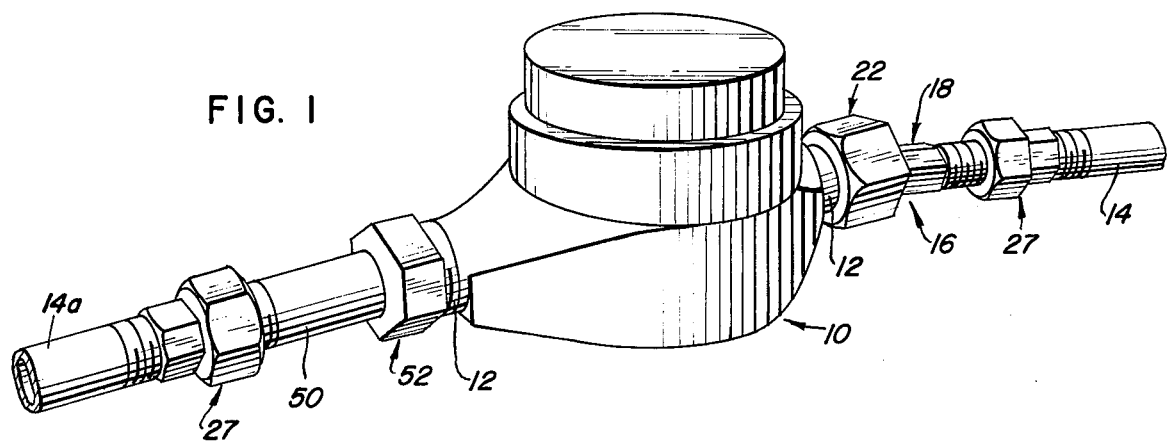
FIG. 1 is a perspective view of a water meter employing a universal joint connector made in accordance with this invention.

Referring now to FIG. 1 of the drawing, a fluid meter 10 is illustrated having opposed spuds 12 comprising the meter inlet and outlet for connection with opposed termini 14 and 14a of a water supply system.

The threaded pipe 14 may comprise a supply conduit from a municipal water system and pipe 14a an outlet conduit from the meter to a user's home water supply system. The meter and conduits of FIG. 1 comprise elements of a water supply system normally found in many houses, apartments and business establishments.

Water meters are normally secured in place by connecting unions, couplings or the like to an existing conduit system which employs elements such as are fragmentarily illustrated in FIG. 1. The conduit systems are normally fixed in place prior to the time of meter connection, e.g., a portion of the municipal supply conduit may be firmly embedded in a concrete basement wall or floor and the outlet conduit to the user's water supply system usually is fixed relative to the user's structure. The ease with which the meter hookup may be effected is dependent upon the alignment of the threaded pipe ends to which the meter inlet and outlet spuds are to be connected.

Misalignment of the supply and outlet conduits may occur from a variety of causes. One source of misalignment is errors in the initial installation of the conduit systems. Another source is subsequent shifting of either the supply or the outlet conduit relative to the other, as in the backfilling after installation of the conduit systems and attendant movement of the earth by heavy equipment. Also, it is of course known that homes and other structures are subject to settling and shifting occasioned by a variety of causes including vibration from passing vehicular traffic, natural earth tremors, changes in the foundation stratum moisture content, etc. Thus, although the pipes to which the meter is connected initially may be in precise alignment, subsequent shifting of the supporting ground or structure may lead to an urging of the water system pipes into misalignment.

Under conditions of any misalignment, dual problems are presented to conveniently installing or replacing a meter. One problem is the physical problem of connecting the meter in fluid-tight relation with the supply and outlet conduits. The second problem is to avoid unacceptable stresses on the meter housing. The stress problem or consideration has assumed somewhat greater importance with the advent of plastic meter bodies, as such bodies typically are less stress-resistant and more susceptible to cracking and leakage under twisting or bending stress loading than prior brass or other metal meter bodies.

Figure 2:
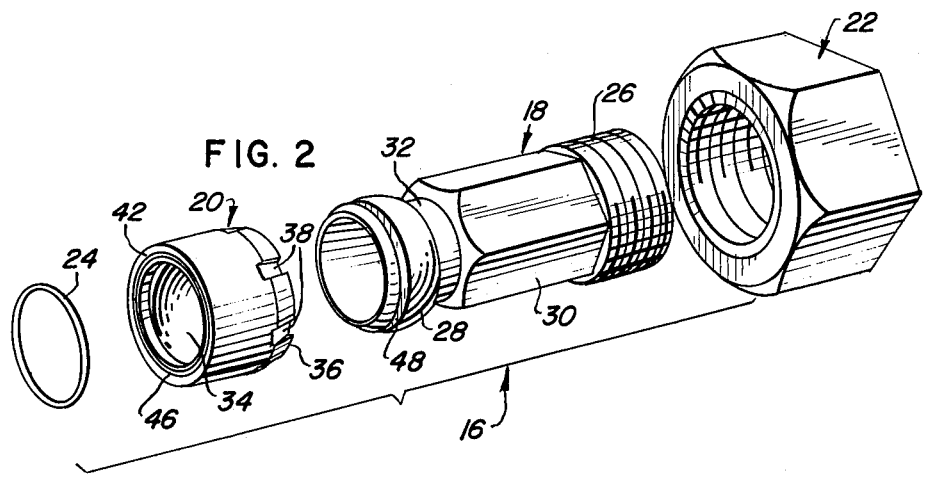
FIG. 2 is an exploded view of elements employed in an embodiment of a connector made pursuant to this invention.

In accordance with this invention, connector assemblies 16, the elements of which are illustrated in FIG. 2, are employed for connecting one or both of the opposed spuds 12 of a water meter 10 (see FIG. 1) to portions of a water supply system. Each connectoor 16 includes a tail piece 18, socket element 20, coupling nut 22 and an optional O-ring 24. The socket element 20 preferably is of a somewhat resilient plastic material such as nylon. The tail piece 18 is threaded at 26 for engagement with a pipe coupling, such as a typical union-type pipe coupling 27 illustrated in FIG. 1, which connects the tail piece of the connector assembly to the end of water supply system pipe 14. The tail piece also preferably is formed of a plastic such as nylon, and includes a spherical ball end 28 connected to main body portion 30 by means of a relieved neck portion 32.

Ball end 28 snaps into and is snugly received in a mating spherical chamber 34 of the socket 20 by slightly distending the end portion 36 (see FIG. 3) of socket 20 prior to being received in the socket chamber 34. That is, the ball end 28 has a diameter slightly greater than that of the internal opening defined by end portion 36 and conforms to chamber 34. It will be noted from FIG. 2 that the socket end portion 36 has annularly spaced, relieved sections 38 of reduced thickness which facilitate the socket end distension during forcible insertion of ball end 28.

Figure 3:
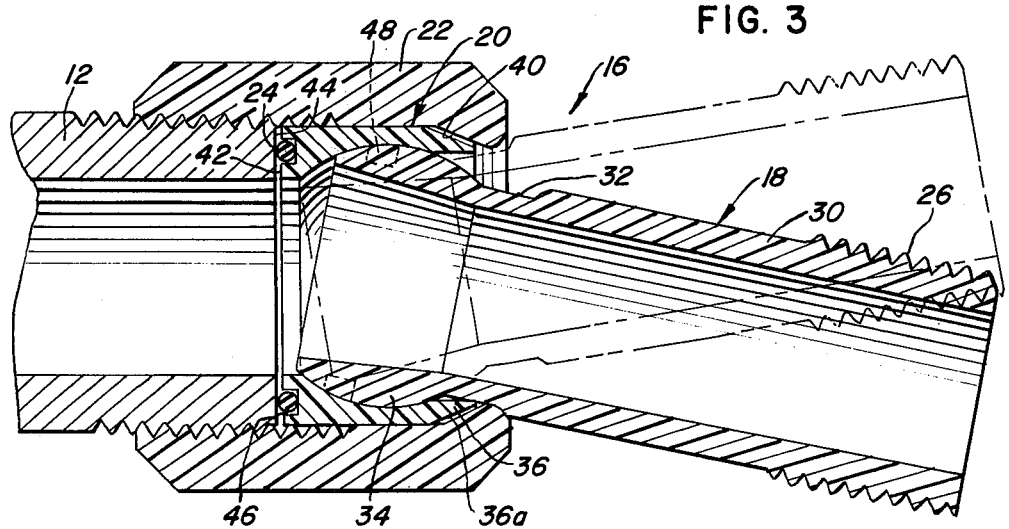
FIG. 3 is a sectional view illustrated on an enlarged scale of the elements of FIG. 2 in assembled condition with a fluid conduit fragmentarily shown.

The nut 22 is internally threaded at one end and is of an inner diameter sufficient to permit sliding of the nut over the tail piece from the position shown in FIG. 2 to the mating position in surrounding radially supportive relation to the socket element 20 as shown in FIG. 3. In the normal course of such assembly, after the tail piece socket engagement. the nut 22 is moved over the tail piece and into threaded engagement with a spud 12 of the meter 10. From FIG. 3 it will also be seen that the interior end portion of nut 22 opposite to the threaded end has a frusto-conical seat 40 for mating engagement with a tapered or conical end surface 36a of socket element 20. As the nut is threaded into engagement over spud 12, the seat 40 engages tapered end surface 36a and the nut thereby urges the socket element 20 toward spud 12 whereby the annular end 42 of the socket 20 is urged against the distal end face 44 of spud 12. The socket end 42, in addition to preventing passage of the ball end 28, may have an outer annular recess 46 for reception of a fluid sealing gasket such as the O-ring 24. Alternatively, the distal end 42 may itself be deformable to serve as a fluid sealing element against the spud end.

The socket opening at end portion 36 is smaller in diameter than the spherical end 28, and the nut 22 supports the socket element 20 against radial expansion when assembled. Accordingly, these components insure retention of the ball end 28 in chamber 34 against tensile forces that may be applied to the tail piece 18 and/or to the connecting spud 12. This arrangement also provides a compressive seal at the ball-socket interface within end portion 36. Since the end portion 36 is distensible and inclined at 36a, the exertion of an endwise force thereon by the inclined nut seat 40, as socket end 42 is seated against spud end 44, compresses the socket end portion 36 radially by a camming action and thereby urges the socket end portion into fluid sealing engagement with the outer spherical surface of ball end 28. Thus seals are formed both at the ball-socket interface and at the spud-socket interface as the nut 22 is tightened, to prevent leakage from the connector joint. Moreover, any axial tensile forces on the tail piece, i.e., to the right in FIG. 3, and opposite axial compressive forces on socket element 20, will cause a camming or wedging action between the mating spherical surfaces of these components within or adjacent end portion 36 and will enhance the ball-socket seal. Thus the greater the axial forces applied to the socket and to the ball, as by axial compressive forces applied to end portion 36 by nut 22 or by tensile forces on tail piece 18, the greater will be the sealing engagement force at the ball-socket interface.

The described sealing cooperation is obtained regardless of the angular position of tail piece 28 relative to the connecting spud 12, within the range of the relative angular movement permitted between the tail piece ball end and the socket element of the connector joint. This range is determined by the external diameter of the tail piece neck 32 and the internal diameter of the socket end portion 36, as noted by the dotted and full line figures of the tail piece in FIG. 3.

In the event additional fluid sealing assurance is desired, as when the connector is employed in conjunction with a vacuum system, ball end 28 of the tail piece may be provided with a recess such as recess 48 illustrated in dotted lines in FIG. 3 for reception of an appropriate gasket (not illustrated) to have sealing engagement with the inner spherical surface 34 of socket element 20.

In one specific exemplary embodiment, providing both surfaces 36a and 40 at an angle of about 20° to the central longitudinal axes of the respective components 18 and 20, with a socket element 20 of type 66 nylon and having a relaxed inner diameter of 0.800 inch for the opening through end portion 36 and a minimum thickness at the outer edges of recesses 38 of 0.010 inch for receiving a ball 28 of 0.844 inch diameter in a chamber 34 of the same diameter, proved satisfactory. Each of the recesses 38 was about 0.090 inch wide, with its inner flat surface also at an angle of about 20° to the longitudinal axis of the socket. The tail piece 18 also was of type 66 nylon. The nut 22 was of glass reinforced type 612 nylon, and was of an inner diameter to provide a nominal 0.007 inch clearance fit around the socket element 20. This embodiment was used to install a Recordall meter (plastic body) sold by Badger Meter, Inc. of Milwaukee, Wisconsin. In addition to the variable angular connection and sealing functions, this assembly exhibited some apparent linear extension or stretching capabilities, such as to allow for some variations of spacing between the connecting pipes 14 and 14a or to allow for thermal contraction and expansion of connecting pipes 14 and 14a while maintaining the desired seals.

Although the foregoing description is specific to the use of the connector with a water meter, the disclosed connector may be used for connecting any type of metering or plumbing device in a plumbing system.

In addition to simplicity of structure and ease of connection to misaligned conduits without undue stress on a connecting meter housing, the universal movement permitted in the provided joint structure minimizes thread stripping and cross-threading of spud threads occasioned by difficulty of hookup under conditions of pipe misalignment. Also, the relative movement permitted between the ball and socket of the provided connector may serve to automatically relieve stresses occasioned by gradually misaligning pipes, as might occur on building settling, by allowing a gradual change in angular disposition between the tail piece ball and socket while constantly maintaining a fluid seal.

The material of fabrication of the connector described, and particularly the socket thereof, should be selected to be chemically inert to the material passing therethrough and for the ability to provide the desired sealing engagement with contiguous elements. In normal use with water meters in circumstances of minor angular misalignment, only one connector as above described need be employed. The opposite connector may be rigid such as by using a connector piece or nipple 50 and a typical conventional union connector 52 is illustrated in FIG. 1 with no permissible angular movement between the elements thereof. When greater degrees of angular misalignment or generally parallel but laterally offset connecting conduits are encountered, use of a pair of connectors 16, either with one or each side of a meter or directly connected to one another in series is beneficial.

While a particular embodiment of this invention is shown and described herein, it will be understood, of course, that the invention is not to be limited thereto since many modifications may be made by those skilled in the art, particularly in light of the foregoing teachings. It is contemplated, therefore, by the appended claims, to cover any such modifications as fall within the true spirit and scope of this invention.

What is claimed is:

1. A plumbing connector assembly for providing a sealed universal joint connection with one end of a fluid conduit, comprising: a tubular tail piece having an end section formed with a rounded exterior surface, and a further portion of substantially lesser diameter than said end section and which extends from said end section; a socket member formed with an internal passage therethrough and which is of a configuration to receive said rounded end section of said tail piece within said socket member through one end of said passage; said socket member including means for preventing passage of said rounded end section through the other end of said member, an annular end disposed axially outward of said means at said other end thereof, and a body portion extending from said annular end and including an annular flexible sealing portion axially located to be circumjacent a portion of said rounded section between the outermost diameter portion of said rounded section and said further portion of said tail piece when said rounded section is seated in said socket member against said means, said body portion being of sufficient rigidity to transmit axial compressive forces from said sealing portion to said annular end; sealing means on said annular end of said socket member for sealing abutment engagement with the end surface of such a fluid conduit; and a connector element adapted to encompass and be moved axially of said socket member toward said other end and to engage an adjacent end portion of such a fluid conduit; said connector and said socket member being of internal diameters at said one end of said socket member substantially greater than the diameter of said further portion of said tail piece; said connector including a radially inwardly extending portion positioned to engage said socket member over said sealing portion as said connector is moved axially along said socket member toward said other end, and said engaging portions of said connector and said socket member being of configurations providing a cam engagement therebetween oriented to urge said socket member axially toward a connected fluid conduit at said other end and thereby to effect sealing engagement of said sealing means with such a fluid conduit and simultaneously to compress said annular sealing portion of said socket member radially inward into sealing engagement with said rounded section in the course of engagement of said connector on such a fluid conduit, whereby sealed joints are formed between said socket member and both said fluid conduit and said rounded section to provide a fluid-tight connection between said tail piece and said conduit in any of various angular positions of said tail piece relative to such a connected conduit and said connector member does not engage said rounded end section in forming said sealed joint.

2. A plumbing connector assembly as in claim 1 wherein said sealing means for forming an abutment seal with such a fluid conduit is an integral part of said socket member.

3. A plumbing connector assembly as in claim 1 wherein said sealing means for forming an abutment seal with such a fluid conduit is an independent compressible fluid sealing ring element.

4. A plumbing connector assembly as in claim 1 wherein said means preventing passage of said rounded end section through said other end of said socket member comprises an integral portion of said socket member.

5. A plumbing connector assembly as in claim 4 wherein said last-mentioned integral portion of said socket member defines a seat of a rounded configuration substantially matching the outer surface configuration of said rounded end section.

6. A plumbing connector assembly as in claim 1 wherein said socket member is formed of resilient material and defines a constricted neck portion adjacent said one end providing an opening therethrough of slightly lesser diameter than said tail piece rounded section, whereby said rounded section may be snapped into said connector by distension of said socket member.

7. A plumbing connector assembly as in claim 1 wherein the outer surface of said annular sealing portion is tapered radially inward toward said one end of said socket member.

8. A plumbing connector assembly as in claim 7 wherein said radially inwardly extending portion of said connector is formed with a tapered surface conforming generally to said tapered outer surface of said annular sealing portion.

9. The assembly of claim 7 in which said annular sealing portion is formed with relieved portions of lesser thickness than interposed tapered portions thereby facilitating flexing of said annular sealing portion.

10. The assembly of claim 1 in which said connector element comprises a threaded nut in which female threads for engaging a fluid conduit are disposed at one end and said inwardly extending portion is disposed at the opposite end.

11. A plumbing connector assembly as in claim 1 wherein said annular end of said socket member is disposed outward of the respective end of said rounded end section of said tail piece when said rounded end section is seated against said passage preventing means.

12. In combination with a first fluid conduit having a male threaded end, a sealed connector joint assembly providing universal movement comprising a tubular tail piece having one end adapted to be connected to a second fluid conduit and having a rounded section at the opposite end, a hollow cylindrical socket member having a distensible portion adjacent one end through which said rounded section is received into said socket member, said socket member having a constricted neck defining the end portion opposite to said distensible portion and providing axial abutment support for said rounded section for preventing passage of said rounded section through said opposite end of said socket member, said end portion including an annular end disposed axially outward of said constricted neck toward the respective end of such a first conduit, sealing means on said annular end for sealing abutment engagement with an end surface of such a first conduit, said distensible portion being axially located to be disposed circumjacent a portion of said tail piece rounded section which is on the remote side of the outermost diameter portion thereof relative to such first conduit when said rounded section is seated in said socket member, said socket member being of sufficient rigidity to transmit axial compressive forces from said distensible portion to said annular end, a connector nut for encompassing said socket member and having a cam portion adapted to engage said distensible portion of said socket member, said nut having female threads spaced from said cam portion and which are engageable with threads of such a first conduit, whereby axial movement of said connector nut upon engagement of said threads thereof with such a conduit applies force through said cam portion to said distensible portion and thereby urges said sealing means at said opposite end of said socket member axially into sealing relationship against said first conduit engaged by said connector nut while simultaneously squeezing said socket member distensible portion into fluid-sealing engagement with the surface portion of said tail piece rounded section circumscribed thereby, and said distensible portion and the surrounding portion of said nut being of substantially greater internal diameter than the portion of said tail piece joined to said rounded section, whereby such sealing relationships may be obtained and maintained in a variety of angular positions of said tail piece relative to such a connected first conduit and said connector member does not engage said rounded end section in forming said sealed joint.

13. The assembly of claim 12 wherein said sealing means comprises a compressible fluid sealing ring interposed between said socket member annular end and such end surface of said first fluid conduit and which is compressed to form a fluid seal therebetween as said connector nut engages said first fluid conduit; said socket member annular end being relieved for reception of said sealing ring.

14. The assembly of claim 12 wherein said tail piece is annularly relieved adjacent said rounded section on such remote side thereof so as to permit greater angular movement between said tail piece rounded section and said socket member.

15. The assembly of claim 12 wherein said annular end of said socket member is disposed outward of the respective end of said rounded end section of said tail piece when said rounded end section is seated in said socket member against said constricted neck.

16. The assembly of claim 15 wherein said socket member is of substantially the same outer diameter as said first conduit, and said connector member being of an inner diameter to have a sliding fit over said socket member.

17. In a combination as in claim 12 including a meter for registering the flow of fluid and having an inlet spud and an outlet spud for communicating with fluid supply lines, one of said spuds constituting said first fluid conduit.

18. The assembly of claim 12 in which a fluid-sealing gasket means is disposed on said tail piece rounded section and in radial engagement with the inner surface of said socket member surface.

* * * * *